(12) United States Patent
Kangras et al.

(10) Patent No.: US 6,957,072 B2
(45) Date of Patent: Oct. 18, 2005

(54) CALIBRATION OF POSITIONING SYSTEMS

(75) Inventors: Ari Kangras, Stockholm (SE); Sven Fischer, Nürnberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 477 days.

(21) Appl. No.: 09/847,357

(22) Filed: May 3, 2001

(65) Prior Publication Data

US 2002/0016172 A1 Feb. 7, 2002

Related U.S. Application Data

(60) Provisional application No. 60/201,424, filed on May 3, 2000.

(51) Int. Cl.$^7$ ................................................ H04Q 7/20
(52) U.S. Cl. .......................... 455/456.1; 455/456.5; 342/450; 342/464
(58) Field of Search .................. 455/456.1, 456.2, 455/456.5, 456.6; 342/450, 457, 350, 357.01, 357.02, 357.1

(56) References Cited

U.S. PATENT DOCUMENTS

| | | | | |
|---|---|---|---|---|
| 4,494,119 A | * | 1/1985 | Wimbush | 342/457 |
| 5,974,329 A | * | 10/1999 | Wylie et al. | 455/456.1 |
| 6,014,102 A | * | 1/2000 | Mitzlaff et al. | 342/457 |
| 6,026,304 A | * | 2/2000 | Hilsenrath et al. | 455/456.2 |
| 6,047,192 A | * | 4/2000 | Maloney et al. | 455/456.2 |
| 6,108,555 A | * | 8/2000 | Maloney et al. | 455/456.2 |
| 6,128,501 A | * | 10/2000 | Ffoulkes-Jones | 455/456.3 |
| 6,154,657 A | * | 11/2000 | Grubeck et al. | 455/456.2 |
| 6,246,884 B1 | * | 6/2001 | Karmi et al. | 455/521 |
| 6,249,253 B1 | * | 6/2001 | Nielsen et al. | 342/463 |
| 6,334,059 B1 | * | 12/2001 | Stilp et al. | 455/404.2 |
| 6,381,463 B1 | * | 4/2002 | Tu et al. | 455/456.5 |
| 6,424,837 B1 | * | 7/2002 | Hall et al. | 455/456.5 |
| 6,489,923 B1 | * | 12/2002 | Bevan et al. | 342/378 |

FOREIGN PATENT DOCUMENTS

| | | |
|---|---|---|
| WO | 98/01768 | 1/1998 |
| WO | 99/55018 | 10/1999 |

* cited by examiner

*Primary Examiner*—Sonny Trinh
*Assistant Examiner*—Marcos L. Torres

(57) ABSTRACT

Mobile station positioning methods are calibrated using an error bias estimation for refining the determination of the mobile station location which does not require any added hardware to the telecommunications system. The position of the mobile station is calculated assuming no bias errors and a first order approximation of the mobile station position is derived as a function of the bias error. The bias error is then estimated and used to refine the previously calculated mobile station position.

16 Claims, 5 Drawing Sheets

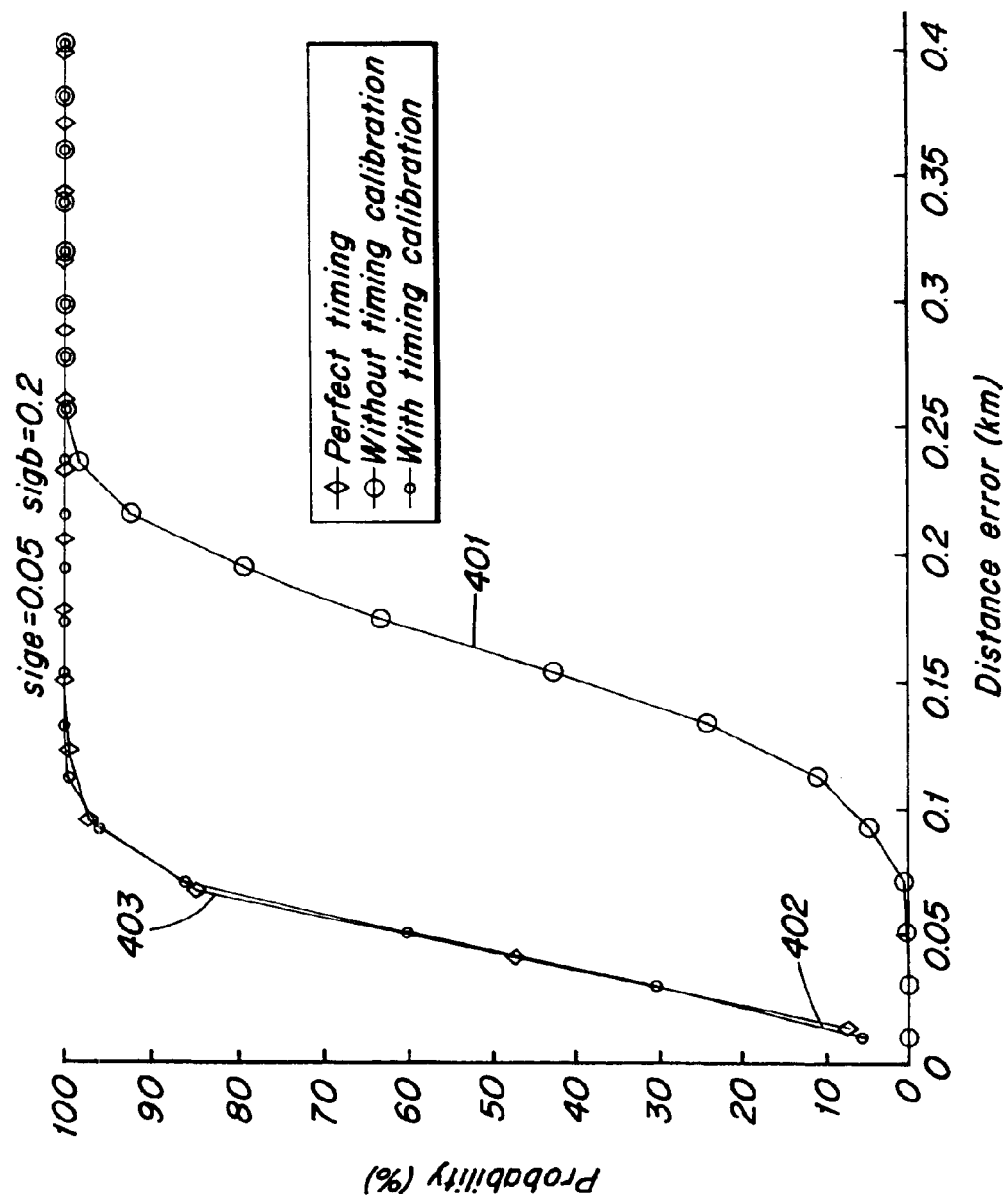

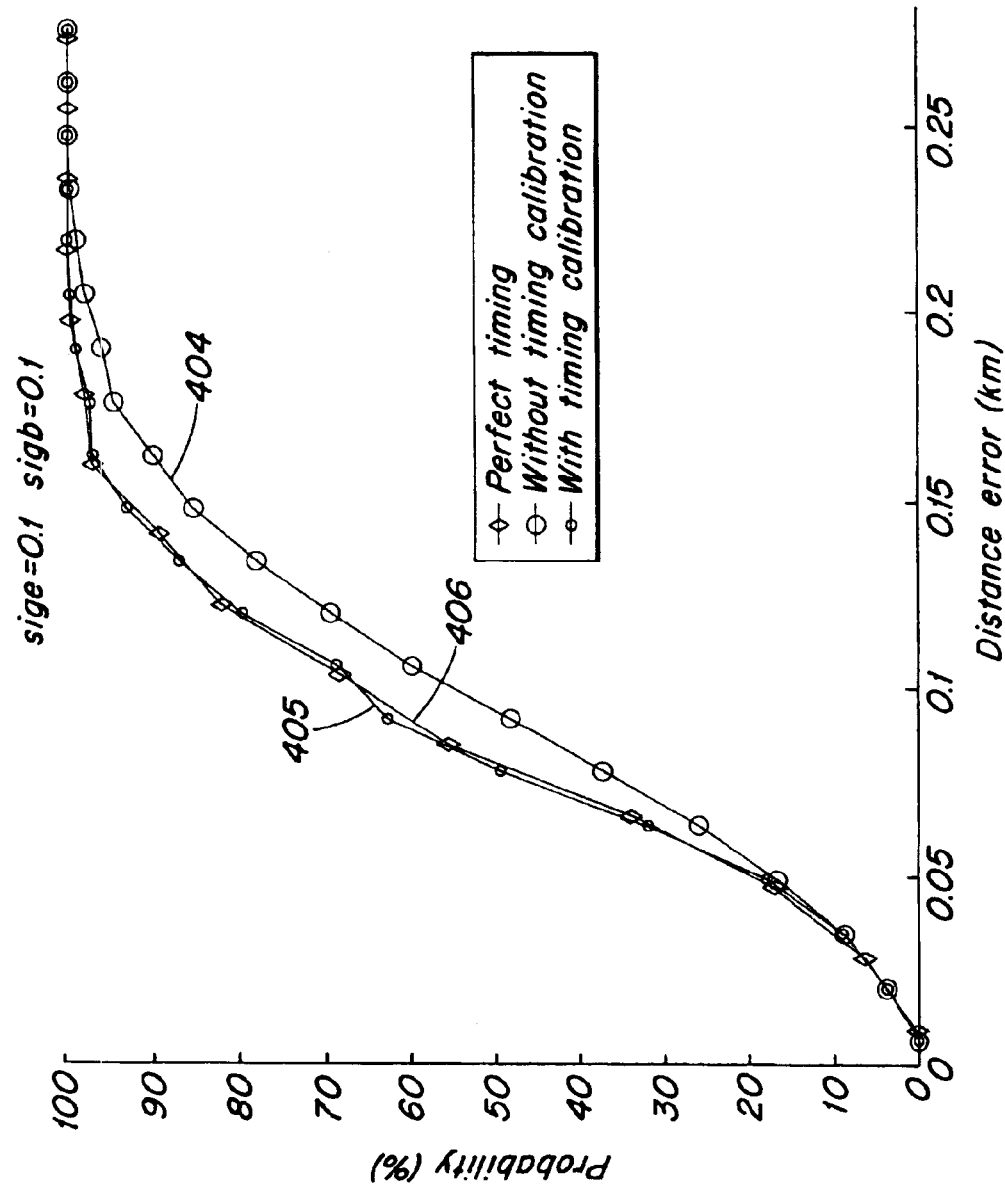

CALIBRATION OF POSITIONING SYSTEMS

This application claims priority under 35 U.S.C. §§ 119 and/or 365 to U.S. Provisional Application Ser. No. 60/201,424 filed in the United States of America on May 3, 2000; the entire content of which is hereby incorporated by reference.

FIELD OF INVENTION

The present invention relates to the positioning of mobile stations within a cellular telecommunications network, and more particularly, to the calibration of positioning systems within a cellular telecommunications network.

BACKGROUND

Legal as well as commercial demands are driving a great interest in developing methods for positioning mobile stations (MS's). While mobile positioning may be achieved through the use of external systems, like Global Positioning Satellite (GPS) systems, mobile positioning can also be achieved by means internal to the cellular system. Several cellular positioning methods have been proposed, each of which relies upon measurements such as time of arrival (TOA), round trip delay, or angle of arrival of communication signals. Cellular positioning methods can be divided into uplink or downlink methods, i.e., whether the base station (BS) performs measurements on mobile station originating signals (uplink methods) or the mobile station performs measurements on base station originating signals (downlink methods). One example of a proposed downlink method is the Enhanced-Observed Time Difference (E-OTD) method. The E-OTD method is based on measuring the time-of-arrival (TOA) of bursts transmitted from a BS on its broadcast control channel (BCCH) carrier.

All location or positioning methods require knowledge of a number of parameters, some time-varying and others of more or less constant nature. These parameters can be TOA measurements, angle of arrival measurements, signal strength measurement or other parameters known to be used in mobile station positioning. For example, the E-OTD method requires that the location of the base stations and the real time difference (RTD) between transmissions from pairs of base stations are precisely known. Whenever these conditions are not fulfilled the location accuracy can be degraded.

As discussed above, the Enhanced-Observed Time Difference is one example of a downlink positioning method. The E-OTD method is based on three quantities: the observed time difference (OTD); the real time difference (RTD); and the geometric time difference (GTD). These three quantities are related by the basic E-OTD equation:

$$OTD = RTD + GTD \quad (1)$$

where OTD is the time difference between the reception of signals from two base stations, RTD is the timing or synchronization difference between two base stations, and GTD is the difference of propagation path length between two base stations. FIG. 1 depicts these quantities which are used in the E-OTD method.

Referring to FIG. 1, if bursts from base station BS1 (e.g. serving base station) are received by a mobile station MS1 at time t1 and bursts from a neighbor base station BS2 are received by the mobile station at time t2, then the observed time difference is calculated as $$OTD = t2 - t1. \quad (2)$$

Likewise, if BS1 transmits its bursts at a time t3 and BS2 transmits its bursts at time t4, then the real time difference is calculated as $$RTD = t4 - t3. \quad (3)$$

Finally, if d1 is the propagation path length from BS1 to MS1, and d2 is the propagation path length between BS2 and MS1, then the geometric time difference is calculated as $$GTD = (d2 - d1)/c, \quad (4)$$

where d1 and d2 are the distance of the propagation path from BS1 and BS2, respectively, and c is the speed of the radio waves, usually taken as the speed of light in vacuum.

As illustrated in equation 5 below, if the OTD and RTD is known, the GTD can be determined in order to derive the location (i.e., position) information.

$$GTD = OTD - RTD \quad (5)$$

Since the GTD is based on the difference in distance between a mobile station and two base stations, a known GTD defines a hyperbola upon which the Mobile station can be located. The position of the mobile station is given by the intersection of the hyperbolas defined by the GTDs, as shown in FIG. 2. Accordingly, at least two GTD values are required in order to locate the mobile station.

Once a mobile station has measured the OTD values, in order to obtain the desired GTD values, the RTDs must be known. In addition, in order to obtain the location of the mobile station from the GTDs, the location of the base stations must be known. There are several methods for obtaining the RTD and the base station location.

One method of obtaining the RTD values is to measure the real time differences using Location Measurement Units (LMUs). In its simplest form, an E-OTD LMU consists of an E-OTD capable mobile station placed at a fixed known location in the network. The E-OTD LMU measures the OTDs between pairs of base stations, and assuming that the locations of the LMUs and the base stations are known (i.e., the GTDs are known), RTD values can be calculated using the following equation:

$$RTD = OTD - GTD \quad (6)$$

Depending on the network and the location of the LMUs (i.e., co-located at a base station site or at a location between base stations), the ratio between base stations and LMUs in the network is estimated to be 3:1 (i.e., for every 3 base stations in the network one LMU is required). Drawbacks of the LMU approach are that it requires new hardware to be deployed in the network, and depending on the stability of the base station clocks, the LMU's may have to report RTDs quite often, which increases the network load.

An alternative method of determining the RTD values is to synchronize the network. This is the case, for example, in IS95 where GPS is used as a timing source. Also for GSM and TDMA, synchronization is being discussed and is indeed a requirement for deployment of a technology called compact EDGE. In a synchronized network, the base stations (or LMUs) don't need to report the RTDs since they are assumed to be constant. However, the synchronization is usually obtained in the digital baseband domain and not the air interface. It will be recognized that synchronization in the air interface is important for accurately determining location as a number of additional delay sources are present in the air interface which must be accounted for, including transmit filters, combiners and transmission lines. One solution for obtaining air interface synchronization is to use an LMU which measures the transmission on the air interface from its serving cell and relates the base station time to absolute time. The alternative of synchronizing the network partially overcomes the drawbacks associated with the LMU method, however; the synchronization needs to take the air interface into account. The required level of synchronization on the air is 5 µs for IS95, which is enough for communication, but far too lax for location services (5 µs corresponds to a traveled distance of 1500 m). Factory calibration of all delay sources, including transmit filters, combiners and transmission lines is one possible solution to accounting for the air interface, but this may be prohibitive for cost reasons.

The base station and LMU locations are normally not known precisely by the operator today, or are not accurate to the level required by location systems. This is due to the fact that for communication purposes exact locations are not that critical. To deploy location systems, therefore, it is necessary to measure precisely the BS and LMU locations, possibly by maintenance personnel equipped with differential GPS receivers.

The problems with base station location calibration is that maintenance personnel need to visit each site and be equipped with differential GPS receivers. This may be costly and furthermore it may not be possible to obtain GPS coverage everywhere, e.g., inside buildings. In some regions in the world, differential GPS might not even be available. In these regions, the operator will have to rely on the accuracy provided by the standard service mode of GPS, which gives location accuracy of around 100 m, 95% of the time.

Accordingly, the invention provides a method for calibration of a positioning system within a telecommunications network which overcomes the drawbacks associated with known calibration methods. The method of the invention has the advantage that no new hardware is required, as it is entirely based on measurements which are made by multiple mobile stations.

SUMMARY OF THE INVENTION

As a solution to the above described problems, a method is disclosed that provides an estimation of the bias errors in the parameters that are relevant for mobile positioning.

According to embodiments of the invention, a method and system for determining mobile positioning is provided which accounts for bias errors in the relevant positioning parameters. This is achieved performing a plurality of measurements associated with a plurality of mobile stations and creating calibration parameters based on estimated mobile positions and the plurality of measurements. The estimated position of the mobiles is then updated using the estimated calibration parameters.

According to another embodiment of the invention, a method for estimating bias errors in relevant positioning parameters is provided.

BRIEF DESCRIPTION OF THE DRAWINGS

These and other objects, features and advantages of the present invention will be readily apparent to one skilled in the art from the following written description, read in conjunction with the drawings, in which:

FIGS. 4A and 4B illustrate resulting location accuracy for different noise variances, using timing calibration in accordance with the present invention.

DETAILED DESCRIPTION OF THE INVENTION

Figure 1:
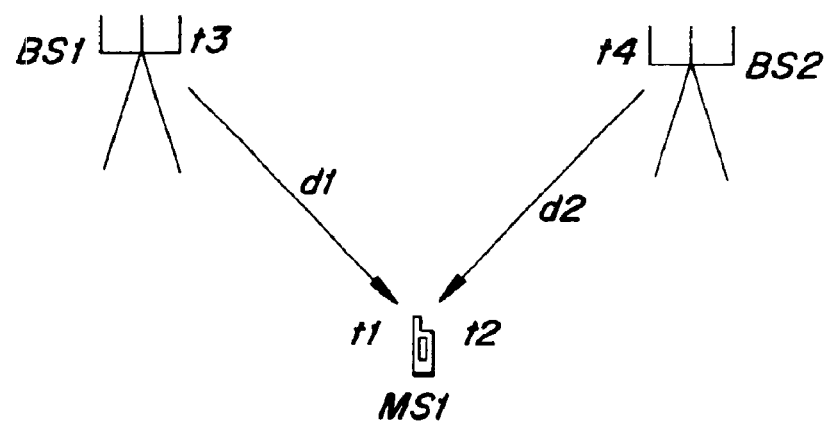
FIG. 1 illustrates the quantities which define OTD, RTD and GTD.
Figure 2:
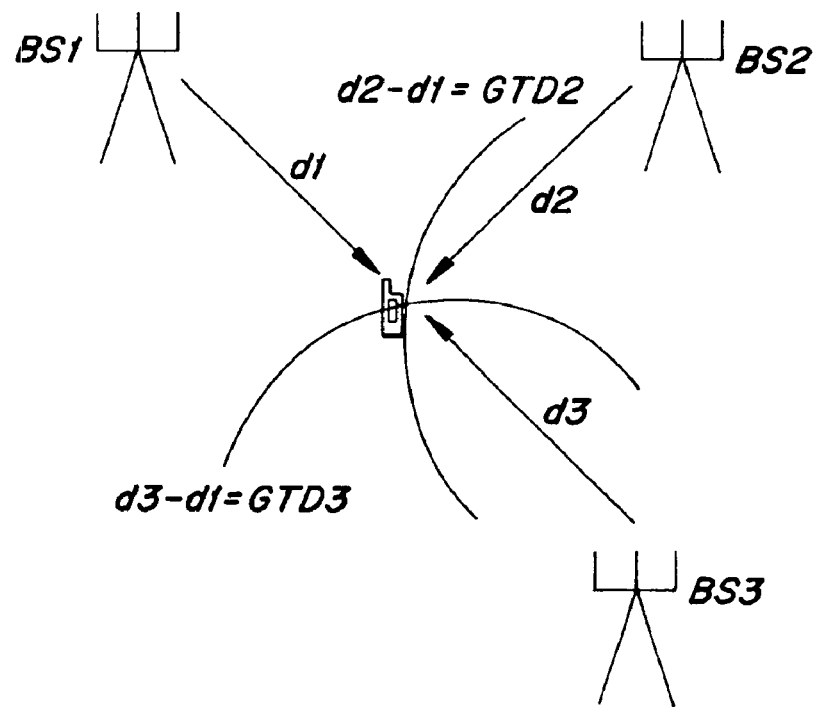
FIG. 2 illustrates the principles of the E-OTD location method.

In the following description, for purposes of explanation and not limitation, specific details are set forth, such as particular techniques, steps, circuits, circuit components etc. in order to provide a thorough understanding of the present invention. However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

These and other aspects of the invention will now be described in greater detail in connection with a number of exemplary embodiments. To facilitate an understanding of the invention, many aspects of the invention are described in terms of sequences of actions to be performed by elements of a communication system. It will be recognized that in each of the embodiments, the various actions could be performed by specialized circuits, by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention.

The calculation of bias error estimates according to an embodiment of the invention is formulated and solved in a generic framework, such that the procedure is applicable to various positioning methods. In the generic case, the measurement equation for determining the location of a mobile station can be defined as $$Y_k = r(z_k, b) + e_k \; k=1, \ldots, N \qquad (7)$$

where $Y_k$ is a generic m-dimensional measurement related to the kth mobile station, b is an n-dimensional vector of unknown biases, $z_k$ is the position of the kth mobile station represented by the column vector $(x_k \; y_k)^T$, and $e_k$ is an additive noise term with covariance $P_k$. Equation (7) can be written in compact form as $$Y = f(z, b) + e \qquad (8)$$

with $$Y = [Y_1^T, \ldots, Y_N^T]^T, f(z,b) = [r(z_1,b)^T, \ldots, r(z_N,b)^T]^T,$$
$$e = [e_1^T, \ldots, e_N^T]^T.$$

The goal is to estimate both the location $z_k$ and the bias vector b. This is achieved by first ensuring that $z_k$ and b can be uniquely estimated.

Generally it is known that the number of equations must be larger than the number of unknowns. This is a necessary requirement, but as shown later, not sufficient. Accordingly, the present invention requires that mN>2N+n−1. For uniqueness, it is also required that $$f(z_1, b_1) = f(z_2, b_2) => z_1 - z_2, b_1 - b_2. \qquad (9)$$

As an example, consider the case of range measurements with uncertain locations. To simplify notation, the coordinates are represented as complex numbers, i.e., z=x+iy. In this case, r becomes $$r(z_k, b_s) = abs(z_k - b_s) \quad (10)$$

where abs( ) represents the elementwise absolute values of the quantity in brackets and $b_s$ denotes the unknown sensor locations. Now $b_{s2}$ is selected such that $$b_{s2} = \exp(i\Phi)(b_s + c) \quad (11)$$

where c is a complex arbitrary constant and $\Phi$ is an arbitrary rotation angle. This process amounts to a translation and rotation of the sensor positions. Then $$\begin{aligned} r(z_k, b_s) &= abs(z_k - b_s) \\ &= abs(z_k - \exp(-i\Phi)^* b_{s2} + c) \\ &= abs(\exp(-i\Phi)(\exp(i\Phi)(z_k + c) - b_{s2}) \\ &= r(\exp(i\Phi)(z_k + c), b_{s2}) \end{aligned} \quad (12)$$

Hence the range measurement corresponding to the mobile station at $z_k$ and sensors at $b_s$ could equally well have been originated from the mobile station located at $\exp(i\Phi)(z_k+c)$ and sensors located at $b_{s2}$. It can easily be verified that this holds for all measurements, i.e., $f(z, b_{s1}) = f(\exp(i\Phi)(z+c), b_{s2})$. Accordingly, the full bias vector can not be estimated. However, if, for example, one sensor location is accurately known and the orientation relative to one other sensor is known, then c and $\Phi$ can be selected such that $b_{s2}$ contains only n−3 unknown parameters.

Now turning to the estimation of $z_1, \ldots z_N$, b, this can be achieved in a least squares sense by minimizing the loss function defined in equation (13) using a Newton-Raphson approach.

$$V(z, b) = \sum_{k=1}^{N} \frac{1}{2} (Y_k - r(z_k, b))^T P_k^{-1} (Y_k - r(z_k, b)) \quad (13)$$

With $\theta = (z_1^T, \ldots, z_N^T, b^T)^T$, one iteration step looks like $$\theta = \theta_0 - V''^{-1}(\theta_0) V'(\theta_0) \quad (14)$$

In addition, with the first derivative of the loss function with respect to position defined as $$dV/dz_k = -G_k^T P_k^{-1} (Y_k - r(z_k, b)) \quad (15)$$

where $G_k$ is the derivative of the function r(z,b) with respect to position, defined as $$G_k = dr(z,b)/dz^T \quad (16)$$

and, with the first derivative of the loss function with respect to the bias vector defined as $$dV/db = \sum_{k=1}^{N} H_k^T P_k^{-1} (Y_k - r(z_k, b)) \quad (17)$$

where $H_k$ is the derivative of the function r(z,b) with respect to bias, defined as $$H_k = dr(z_k, b)/db^T \quad (18)$$

The derivative vector of the loss function of equation (13) can therefore be written as shown in equation (19).

$$r' = (\Theta) = \left[ (G_1^T P_1^{-1}(Y_1 - r(z_1, b)))^T \ldots (G_N^T P_N^{-1}(Y_N - r(z_N, b)))^T, \left( \sum H_k^T P_k^{-1}(Y_k - r(z_k, b)) \right) \right] \quad (19)$$

The second derivatives are $$dV/dz_k dz_k^T = G_k^T P_k^{-1} G_k \quad (20)$$

$$dV/dz_k dz_j^T = 0 \quad (21)$$

$$dV/dz_k db^T = G_k^T P_k^{-1} H_k \quad (22)$$

$$dV/db\, db^T = \sum_{k=1}^{N} H_k^T P_k^{-1} H_k \quad (23)$$

$$dV/db\, dz_k^T = H_k^T P_k^{-1} G_k \quad (24)$$

The second derivative matrix can thus be written as $$V''(\theta) = \begin{vmatrix} G_1^T P_1^{-1} G_1 & 0 & 0 & G_1^T P_1^{-1} H_1 \\ 0 & \cdots & 0 & \cdots \\ 0 & 0 & G_N^T P_N^{-1} G_N & G_N^T P_N^{-1} H_N \\ H_1^T P_1^{-1} G_1 & \cdots & H_N^T P_N^{-1} G_N & \sum_{k=1}^{N} H_k^T P_k^{-1} G_k \end{vmatrix} \quad (25)$$

Iteration Steps:

The second derivative matrix can be partitioned as $$V'' = \begin{vmatrix} A & B \\ D & C \end{vmatrix} \quad (26)$$

where $$A = \begin{bmatrix} G_1^T P_1^{-1} G_1 & 0 & 0 \\ 0 & \cdots & 0 \\ 0 & 0 & G_N^T P_N^{-1} G_N \end{bmatrix}, \quad B = \begin{bmatrix} G_1^T P_1^{-1} H_1 \\ \cdots \\ G_N^T P_N^{-1} H_N \end{bmatrix},$$

$$D = [ H_1^T P_1^{-1} G_1 \cdots H_N^T P_N^{-1} G_N ], \text{ and } C = \left| \sum_{k=1}^{N} H_k^T P_k^{-1} H_k \right|.$$

By using results on inverses of the partitioned matrices, it can be shown that $$\begin{bmatrix} A & B \\ D & C \end{bmatrix}^{-1} = \begin{bmatrix} U & V \\ W & X \end{bmatrix}. \quad (27)$$

Similarly, the first derivative matrix can be partitioned into $$V' = [E^T F^T]^T \quad (28)$$

with $$E = [(G_1^T P_1^{-1}(Y_1 - r(z_1, b)))^T, \ldots, (G_N^T P_N^{-1}(Y_N - r(z_N, b)))^T]^T \quad (29)$$

and $$F = \sum_{k=1}^{N} H_k^T P_k^{-1}(Y_k - r(z_k, b)) \quad (30)$$

This means that the update for b will be as shown in equation (31).

$$b = b_0 - WE - XF \quad (31)$$

Figure 3:
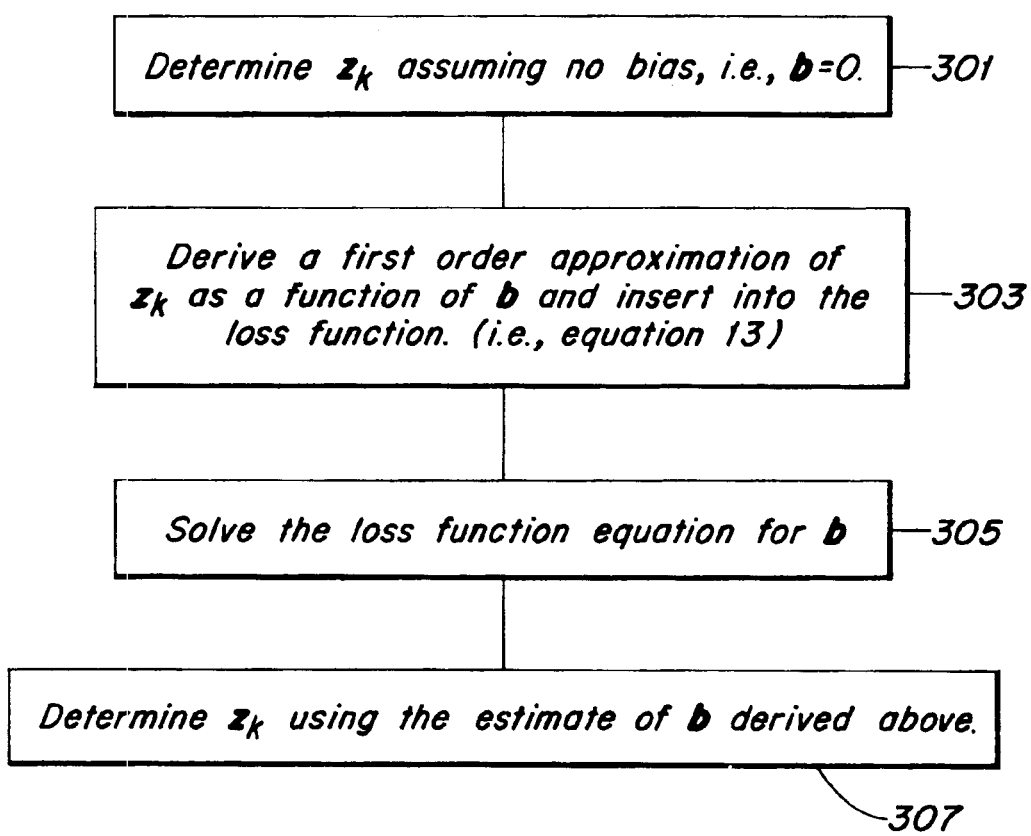
FIG. 3 illustrates the steps of the bias estimation procedure.

As shown in FIG. 3, the procedure for estimating the bias error begins as step 301 by determining $z_k$ assuming no bias, i.e, b=0. This is achieved by selecting $z_k$ to minimize $V(z_k, b_0)$, where $b_0$ is the apriori value of the bias vector. Call these values $z_{k0}$. In this case the minimizing $z_{k0}$ satisfies $V'(z_{k0}, b_0)=0$. Then, at step 303, an approximation of $z_k$ as a function of b is derived as discussed above. But since the vector E consists of $V'(z_{k0}, b_0)$, k=1, ..., N it follows that E=0, hence equation (31) reduces to that shown in equation (32).

$$b = b_0 - XF \quad (32)$$

Then at step 305, the approximation derived in step 303 is solved for b. It is well known in the literature that an explicit expression for X can be defined as shown in equation (33), provided the inverses exist.

$$X = (C - DA^{-1}B)^{-1} \quad (33)$$

The final expression for equation (32) then becomes $$b = b_0 - \left\{ \sum_{k=1}^{N} H_k^T P_k^{-1} H_k - \sum_{k=1}^{N} (H_k^T P_k^{-1} G_k (G_k P_k^{-1} G_k)^{-1} G_k^T P_k^{-1} H_k) \right\}^{-1} \left( \sum_{k=1}^{N} H_k^T P_k^{-1}(Y_k - r(z_{k0}, b_0)) \right) \quad (34)$$

Finally, in step 307, $z_k$ is determined using the updated estimate of b derived in step 305.

This procedure for estimating bias errors can be utilized in known or proposed positioning methods, for example, a E-OTD positioning method with timing calibration error. In this E-OTD positioning method the mobile station performs pseudorange measurements so that the basic measurement equation is $$\rho_k = \rho(z_k) + c + d_k + v_k \quad (35)$$

with $$\rho(z) = \sqrt{(x-x_s)^2 + (y-y_s)^2} \quad (36)$$

where c is the unknown timing calibration bias, d is related to the unknown transmit time, and v is a noise term with covariance N, and $x_s$ and $y_s$ of equation (36) are the base station coordinate vectors. The goal is to estimate c and z (and d) simultaneously. The unknown scalar d is usually eliminated by defining the differences of the pseudorange measurements, T, as $$T = \begin{bmatrix} 1 & -1 & 0 & \cdots & 0 \\ 1 & 0 & -1 & 0 & \cdots \\ \cdots & \cdots & \cdots & \cdots & 0 \\ 1 & 0 & \cdots & 0 & -1 \end{bmatrix} \quad (37)$$

with the remaining parameters defined as b=Tc, r(z,b)=Tρ(z)+b, c=Tv, cov(e)=P=TNT$^T$, then the resulting equation is exactly (7). Note that a consequence of the reformulation above is that b and not c will be possible to estimate. It is straightforward to show that in this special case, G of equation (16), becomes $$G = TJ \quad (38)$$

where J is the derivative of ρ, defined as $$J = \begin{bmatrix} \frac{x-x_1}{\rho_1} & \cdots & \frac{x-x_n}{\rho_n} \\ \frac{y-y_1}{\rho_1} & \cdots & \frac{y-y_n}{\rho_n} \end{bmatrix}^T \quad (39)$$

Furthermore, H of equation (18), in this case, the derivative of ρ with respect to b becomes simply the identity matrix I.

$$H = I \quad (40)$$

To illustrate the above procedure, a small network consisting of 5 base stations was simulated. The base stations were arranged in a circle, and 300 mobile stations were randomly placed in the vicinity of the base stations. Pseudoranges ρ were estimated by computing the MS-BS distances, adding a random calibration bias which was the same for all mobile stations and an individual transmission time bias term. White noise was added to the pseudoranges ρ. The locations were estimated assuming zero bias and in the second step the calibration bias was estimated. The mobile station locations were then recalculated using the estimated bias terms. The resulting location accuracy is illustrated in FIGS. 4A and 4B for different values of the noise variance and the magnitude of the bias errors. The results without timing calibration (curves 401 and 404), with timing bias elimination (curves 402 and 405) and, for comparison, from a bias free run (curves 403 and 406) are shown. As illustrated by curves 402 an 405, the bias is almost completely eliminated in both cases using the method in accordance with the invention.

This procedure can also be applied to E-OTD methods where there is uncertainty in the BTS locations. In this E-OTD positioning method (i.e., with BTS location uncertainty), the measurement equation is identical to the previous case except $$r(z_k, b) = T\rho(z_k, b) \quad (41)$$

where $$\rho(z) = \sqrt{(x-(x_s+b_x))^2 + (y-(y_s+b_y))^2} \quad (42)$$

and b=[$b_x, b_y$]$^T$. As discussed above, it is not possible to estimate $z_k$ and b uniquely. To restrict the search space it is assumed that the location of the first two base stations are well known. In this case, the matrix G is also identical to equation (38), however; the matrix H is defined as $$H = TK \quad (43)$$

where K is the derivative of ρ(z) with respect to $b_x$ and $b_y$, defined as $$K = \begin{bmatrix} 0 & \cdots & 0 & 0 & \cdots & 0 \\ 0 & \cdots & 0 & 0 & \cdots & 0 \\ \frac{-(x-x_3)}{\rho_3} & \cdots & 0 & \frac{-(y-y_3)}{\rho_3} & \cdots & 0 \\ 0 & \cdots & 0 & 0 & \cdots & 0 \\ 0 & 0 & \frac{-(x-x_n)}{\rho_n} & 0 & 0 & \frac{-(y-y_n)}{\rho_n} \end{bmatrix} \quad (44)$$

Figure 5:
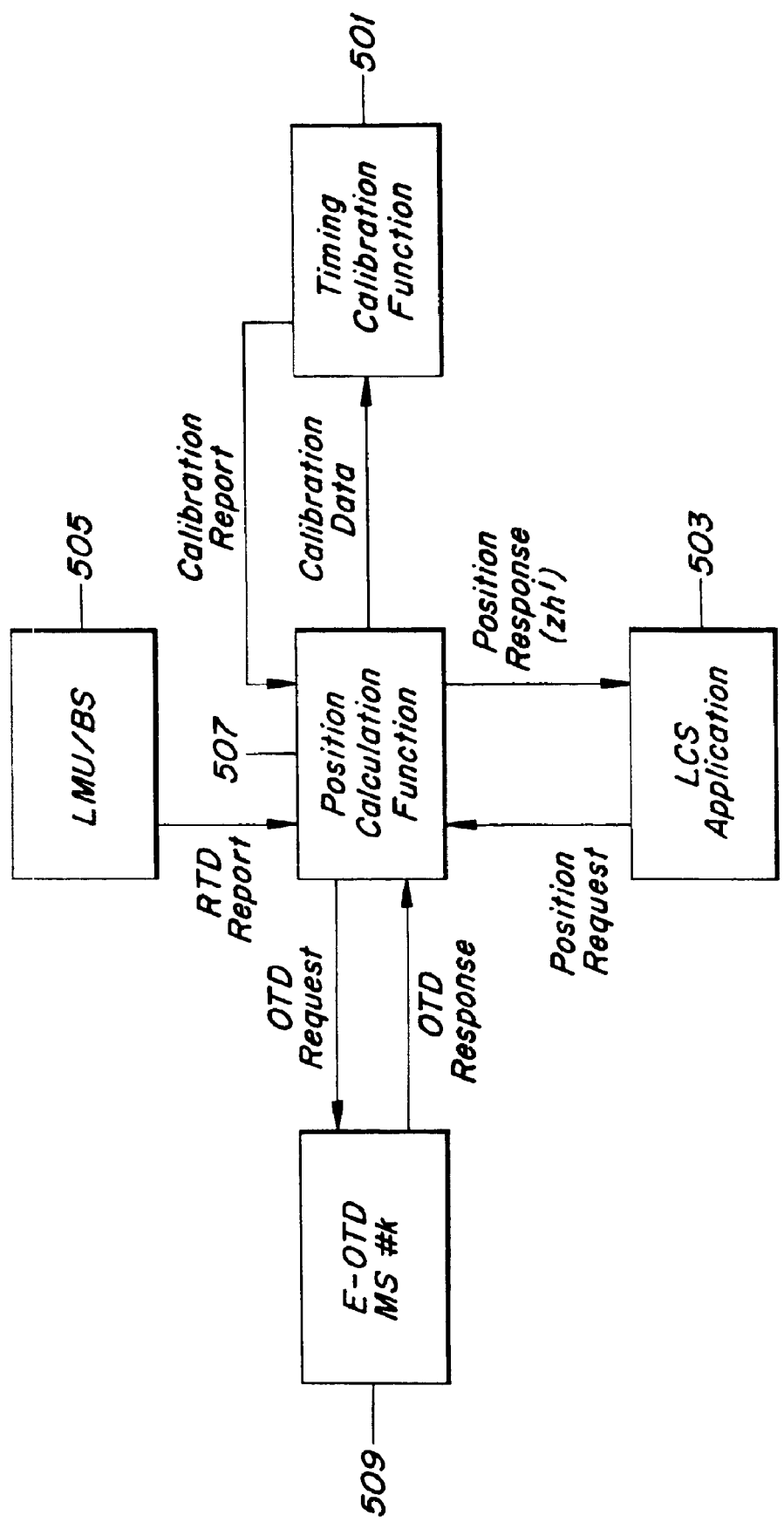
FIG. 5 illustrates an exemplary embodiment of the present invention.

FIG. 5 illustrates the principle of operation of the invention in connection with timing calibration bias. With reference to FIG. 5, the Location Services (LCS) application 503 sends a request for a location to a mobile location center, which is illustrated in FIG. 5 as position calculation function (PCF) 507. The PCF 507 upon receiving the request sends an E-OTD measurement request message to a mobile station, illustrated in FIG. 5 as E-OTD MS#k 509. The Mobile station performs the necessary E-OTD measurements (e.g., pseudoranges) and sends the results back to PCF 507 in an E-OTD Measurement Response message. The PCF 507 computes the position of the Mobile station using, for example, equation (5). The resulting estimate is sent to the location application requesting the location. In parallel, the location estimate, along with the previous estimate of the calibration bias and mobile station reported pseudoranges, are sent with a calibration data message to the Timing calibration function 501. The Timing Calibration Function 501 collects received location estimates from PCF 507 until sufficient data is available to perform calibration bias estimation according to equation (34). The resulting estimate is forwarded to PCF 507 in a Timing Calibration report. Periodically, or depending on the synchronization architecture, PCF 507 also receives RTD reports from Location Measurement Units (LMUs) or Base Stations (BS) 505. The PCF 507 uses initially the RTD reports in the position calculation, and later includes the updated calibration reports from the Timing calibration function 501. It will be recognized that FIG. 5 represents functional elements used in accordance with exemplary embodiments of the present invention and that these functional elements may be contained in one node in a radio communication system, or may be distributed across several nodes.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed:

1. A method of calibrating a mobile station location system in a cellular telecommunications network, the method comprising the steps of:
   determining a position ($z_{k0}$) of a mobile station in the telecommunications network assuming no bias error;
   deriving, concurrently, an approximation of the position ($z_k$) of a $k_{th}$ mobile station as a function of an n-dimensional vector (b) of unknown biases according to a calibration bias estimation equation $$b = b_0 - \left\{ \sum_{k=1}^{N} H_k^T P_k^{-1} H_k - \sum_{k=1}^{N} (H_k^T P_k^{-1} G_k (G_k P_k^{-1} G_k)^{-1} G_k^T P_k^{-1} H_k) \right\}^{-1}$$

$$\left( \sum_{k=1}^{N} H_k^T P_{k-1} (Y_k - r(z_{k0}, b_0)) \right)$$

wherein b is an updated estimate of $b_0$, $b_0$ is the apriori value of a bias vector, $Y_k$ is a generic m-dimensional measurement related to the $k_{th}$ mobile station, $z_k$ is the position of the $k_{th}$ mobile station represented by the column vector (xy), $H_k$ is a derivative of r(z,b) with respect to bias and $G_k$ is a derivative of the function of r(z,b) with respect to position; and refining the position ($z_{k0}$) of the mobile station, using the updated estimate of b, according to the equation $$Y_k = r(z_k, b) + e_k$$

where k=1, . . . ,N, and $e_k$ is an additive noise term with covariance $P_k$.

2. The method of claim 1, wherein the step of deriving an approximation of the position ($z_k$) of a $k_{th}$ mobile station as a function of an n-dimensional vector (b) of unknown biases further comprises the step of
   selecting zhd kto minimize loss function V($z_k$,$b_0$), wherein $z_{k0}$ satisfies V'($z_{k0}$,$b_0$)=0.

3. The method of claim 2 wherein the n-dimensional vector (b) is calculated for multiple mobile stations.

4. The method of claim 3, wherein the calculated value of b of the multiple mobile stations is fed to a position calculation function (PCF) for improving the accuracy of the bias parameters used for determining a refined position of a target mobile station.

5. The method of claim 4, further comprising the steps of
   sending the calculated value of b of the multiple mobile stations to a timing calibration function and the position ($z_{k0}$) of the mobile station to the position calculation function;
   the timing calibration function performing calibration bias estimation; and
   forwarding the results to the position calculation function for inclusion in computing the refined position of the target mobile station.

6. The method of claim 1 wherein the mobile station location system is a time of arrival mobile station location system.

7. The method of claim 1 wherein the mobile station location system is an angle of arrival mobile station location system.

8. The method of claim 1, further comprising the step of the mobile station performing the necessary measurements for computing the original estimate of the position of the mobile station.

9. A system for calibrating a mobile station location system in a cellular telecommunications network, the system comprising:
   means for determining a position ($z_{k0}$) of a mobile station in the telecommunications network assuming no bias error;
   means for deriving, concurrently, an approximation of the position ($z_k$) of a $k_{th}$ mobile station as a function of an n-dimensional vector (b) of unknown biases according to a calibration bias estimation equation $$b = b_0 - \left\{ \sum_{k=1}^{N} H_k^T P_k^{-1} H_k - \sum_{k=1}^{N} (H_k^T P_k^{-1} G_k (G_k P_k^{-1} G_k)^{-1} G_k^T P_k^{-1} H_k) \right\}^{-1} \left( \sum_{k=1}^{N} H_k^T P_{k-1} (Y_k - r(z_{k0}, b_0)) \right)$$

wherein b is an updated estimate of $b_0$, $b_0$ is the apriori value of a bias vector, $Y_k$ is a generic m-dimensional measurement related to the $k_{th}$ mobile station, $z_k$ is the position of the $k_{th}$ mobile station represented by the column vector (xy), $H_k$ is a derivative of r(z,b) with respect to bias and $G_k$ is a derivative of the function of r(z,b) with respect to position; and means for refining the position ($z_{k0}$) of the mobile station using the updated estimate of b, according to the equation $$Y_k = r(z_k, b) + e_k$$

where k=1, . . . ,N, and $e_k$ is an additive noise term with covariance $P_k$.

10. The system of claim 9, wherein the means for deriving an approximation of the position ($z_k$) of a $k_{th}$ mobile station as a function of an n-dimensional vector (b) of unknown biases further comprises means for selecting $z_k$ to minimize loss function designated V($z_k$,$b_0$), wherein $z_{k0}$ satisfies V'($z_{k0}$,$b_0$)=0.

11. The system of claim 10 wherein the n-dimensional vector (b) is calculated for multiple mobile stations.

12. The system of claim 11, further comprising means for sending the calculated value of b of the multiple mobile stations to a position calculation function (PCF) for improving the accuracy of the bias parameters used for determining the refined position of a target mobile station.

13. The system of claim 12, further comprising:

means for sending the calculated value of b of the multiple mobile stations to a timing calibration function and for sending the position ($z_{k0}$) of the mobile station to the position calculation function;

the timing calibration function performing calibration bias estimation and forwarding the results to the position calculation function for inclusion in computing the refined position of the target mobile station.

14. The system of claim 9 wherein the mobile station location system is a time of arrival mobile station location system.

15. The system of claim 9 wherein the mobile station location system is an angle of arrival mobile station location system.

16. The system of claim 9, wherein the mobile station performs the necessary measurements for computing the original estimate of the position of the mobile station.

* * * * *

UNITED STATES PATENT AND TRADEMARK OFFICE
CERTIFICATE OF CORRECTION

PATENT NO.        : 6,957,072 B2
APPLICATION NO.   : 09/847357
DATED             : October 18, 2005
INVENTOR(S)       : Ari Kangras et al.

Page 1 of 1

It is certified that error appears in the above-identified patent and that said Letters Patent is hereby corrected as shown below:

In column 4, Line 56, in Equation No. 8, delete
"$Y=[Y_1^T, \ldots, Y_N^1]^1, f(z,b)=[r(z_1,b)^T, \ldots, r(z_N,b)^T]^T, e=[e_1^T, \ldots, e_N^T]^T$"
and insert
-- $Y=[Y_1^T, \ldots, Y_N^T]^T, f(z,b)=[r(z_1,b)^T, \ldots, r(z_N,b)^T]^T, e=[e_1^T, \ldots, e_N^T]^T$ --
therefore.

In column 4, Line 66, in Equation 9, delete "$f(z_1,b_1)=f(z_2,b_2) =>z_1-z_2, b_1 - b_2$" and insert
-- $f(z_1,b_1)=f(z_2,b_2) =>z_1 = (z_2,b_1) = b_2$ -- therefore.

In column 10, Line 30, in Claim 2, delete "zhd kto" and insert -- $z_k$ to --, therefore.

In column 11, Line 33, in Claim 10, delete "$V(z_b b_0)$" and insert -- $V(z_k, b_0$ --, therefore.

Signed and Sealed this

Eighteenth Day of December, 2007

JON W. DUDAS
*Director of the United States Patent and Trademark Office*